Dec. 5, 1944.   J. J. STEVENSON   2,364,557
RANGE FINDER
Filed Oct. 6, 1941   4 Sheets-Sheet 2

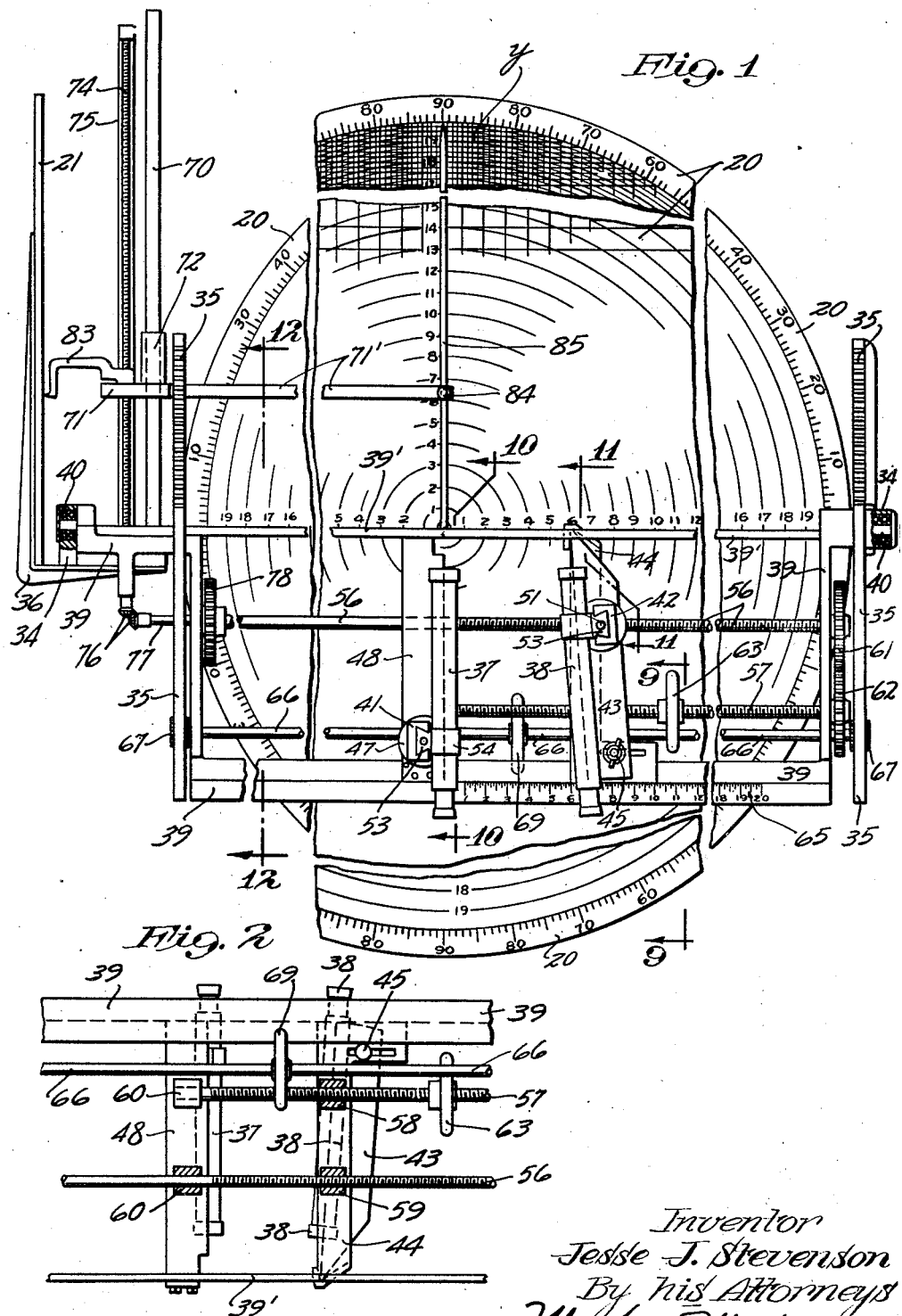

Inventor
Jesse J. Stevenson
By his Attorneys

Dec. 5, 1944.  J. J. STEVENSON  2,364,557
RANGE FINDER
Filed Oct. 6, 1941   4 Sheets-Sheet 3
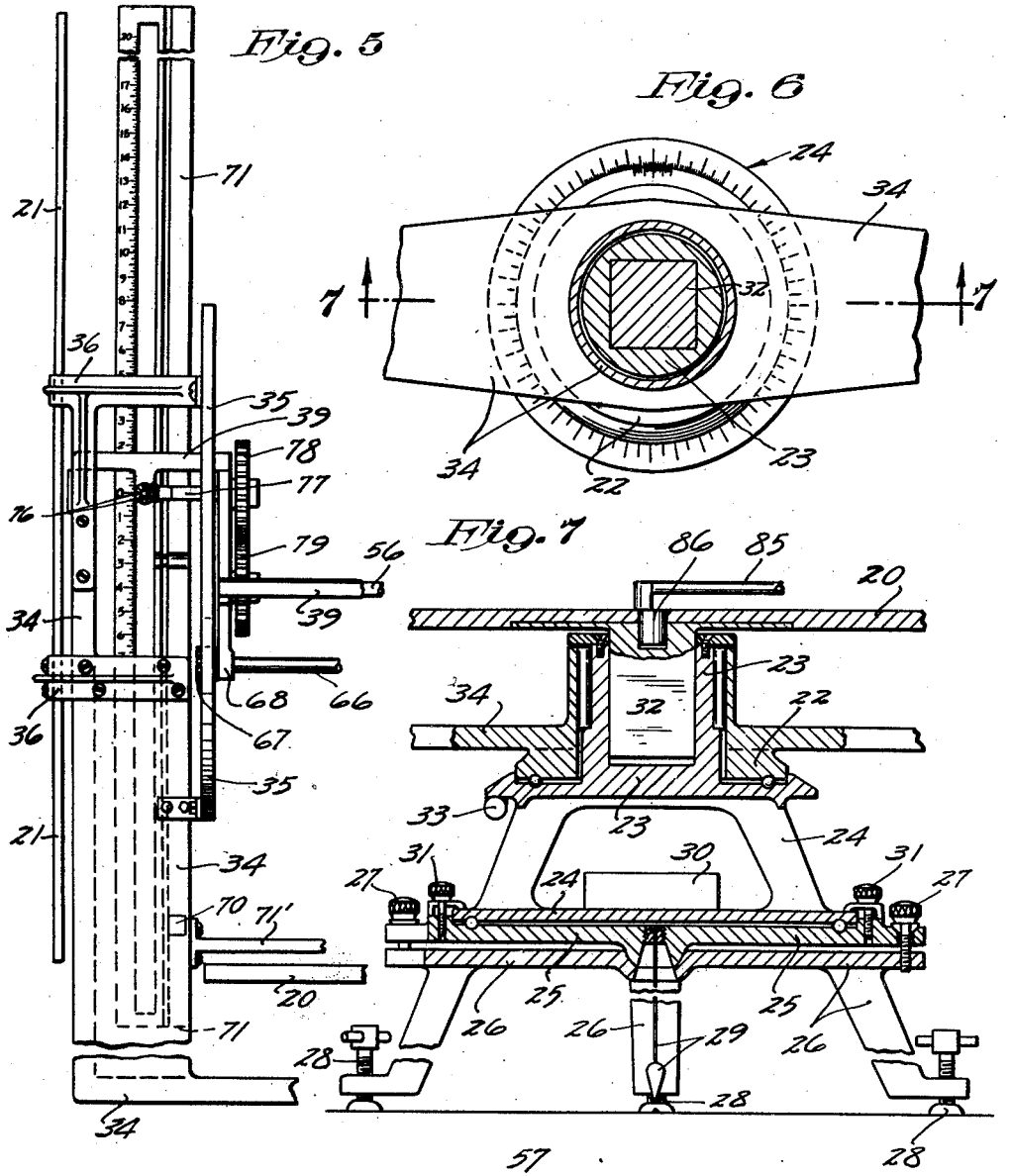
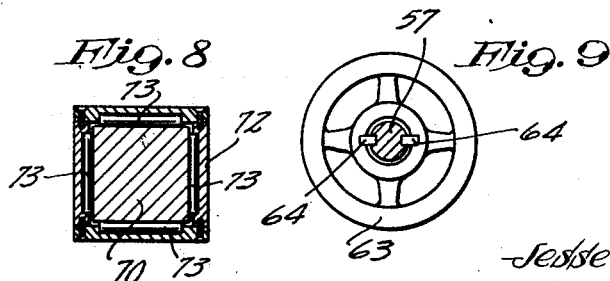
Inventor
Jesse J. Stevenson
By his Attorneys
Merchant & Merchant

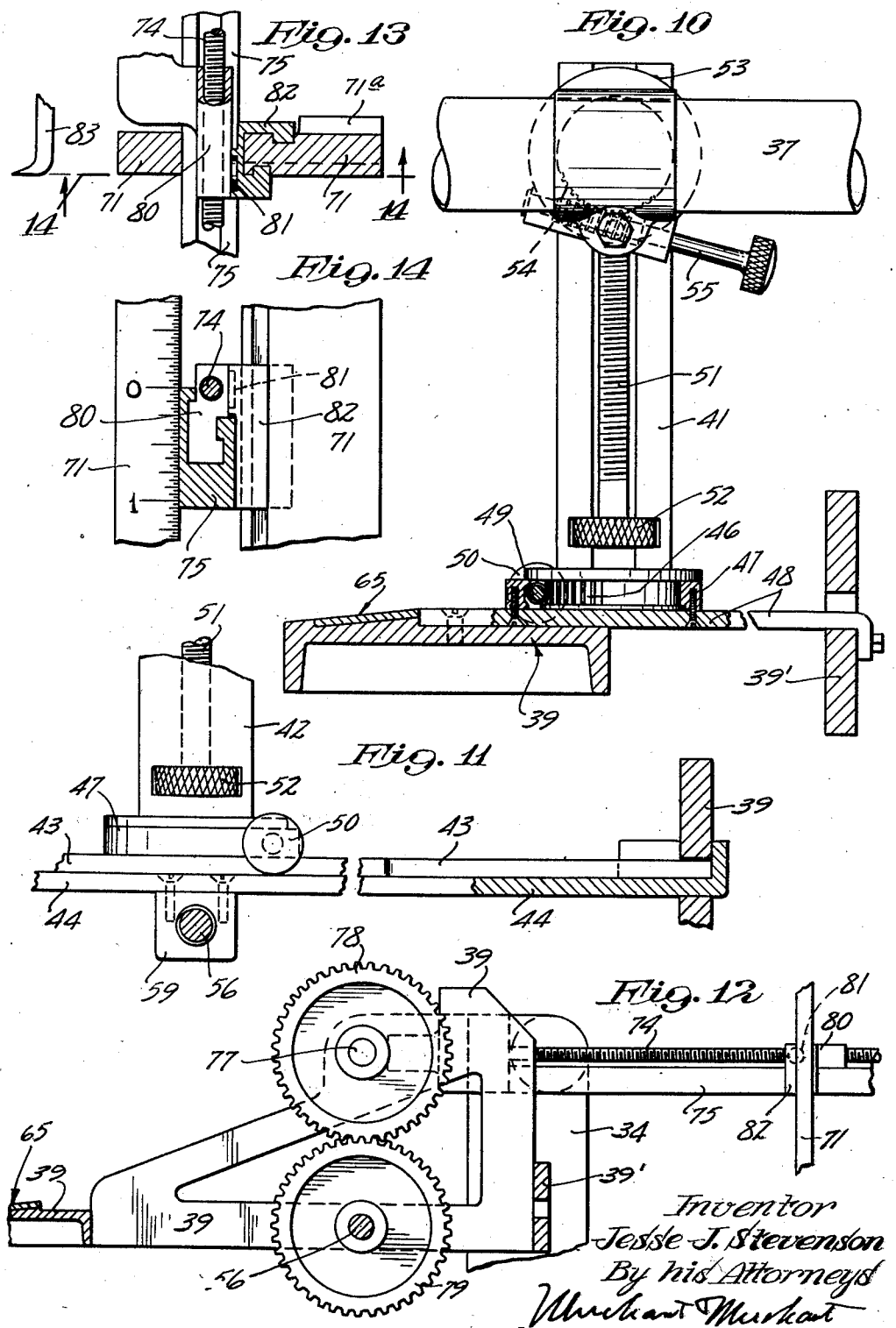

Patented Dec. 5, 1944

2,364,557

UNITED STATES PATENT OFFICE 2,364,557

RANGE FINDER

Jesse J. Stevenson, Minneapolis, Minn.

Application October 6, 1941, Serial No. 414,518

4 Claims. (Cl. 33—65)

My invention provides an instrument which I designate as a "range finder" but which, nevertheless, is capable of a wide range of usage in determining the location of distant objects including such measurements as the distance from the point of survey, the altitude and height of the distant object, and/or the distance between remote objects. This device is, therefore, useful as a range finder and as an instrument for laying out and charting geodetic plots.

The instrument makes unnecessary the use of trigonometrical calculations. The instrument is designed so that by various adjustments the resulting calculations will be visually indicated and, when desired, marked or charted diagrammatically. The nature of this device will be more readily understood after first having described an instrument of the character above indicated.

In the accompanying drawings, which illustrate the instrument, like characters indicate like parts throughout the several views.

Referring to the drawings:

Fig. 1 is a plan view of the instrument, some parts being broken away and some parts being sectioned;

Fig. 2 is a bottom plan view showing the co-operating telescopes or sighting devices, supports, and means for supporting the same and adjusting the one in respect to the other, some parts being broken away;

Fig. 5 is a fragmentary front elevation looking from left toward the right in respect to Fig. 3 and showing parts of the instrument that are located at the left or far side of the said instrument;

Fig. 6 is a fragmentary horizontal section taken on the line 6—6 of Fig. 3, some parts being broken away and some parts removed;

Fig. 7 is a vertical section taken on the line 7—7 of Fig. 6, some parts being broken away;

Fig. 8 is a detail in section taken on the line 8—8 of Fig. 3;

Fig. 9 is a detail in section taken on the line 9—9 of Fig. 1;

Fig. 10 is a detail partly in elevation and partly in section taken approximately on the line 10—10 of Fig. 1;

Fig. 11 is a detail partly in elevation and partly in section taken on the line 11—11 of Fig. 1;

Fig. 12 is a section taken on the line 12—12 of Fig. 1;

Fig. 13 is a fragmentary section taken approximately on the line 13—13 of Fig. 3; and Fig. 14 is a section taken approximately on the line 14—14 of Fig. 13.

Figures 3, 4:
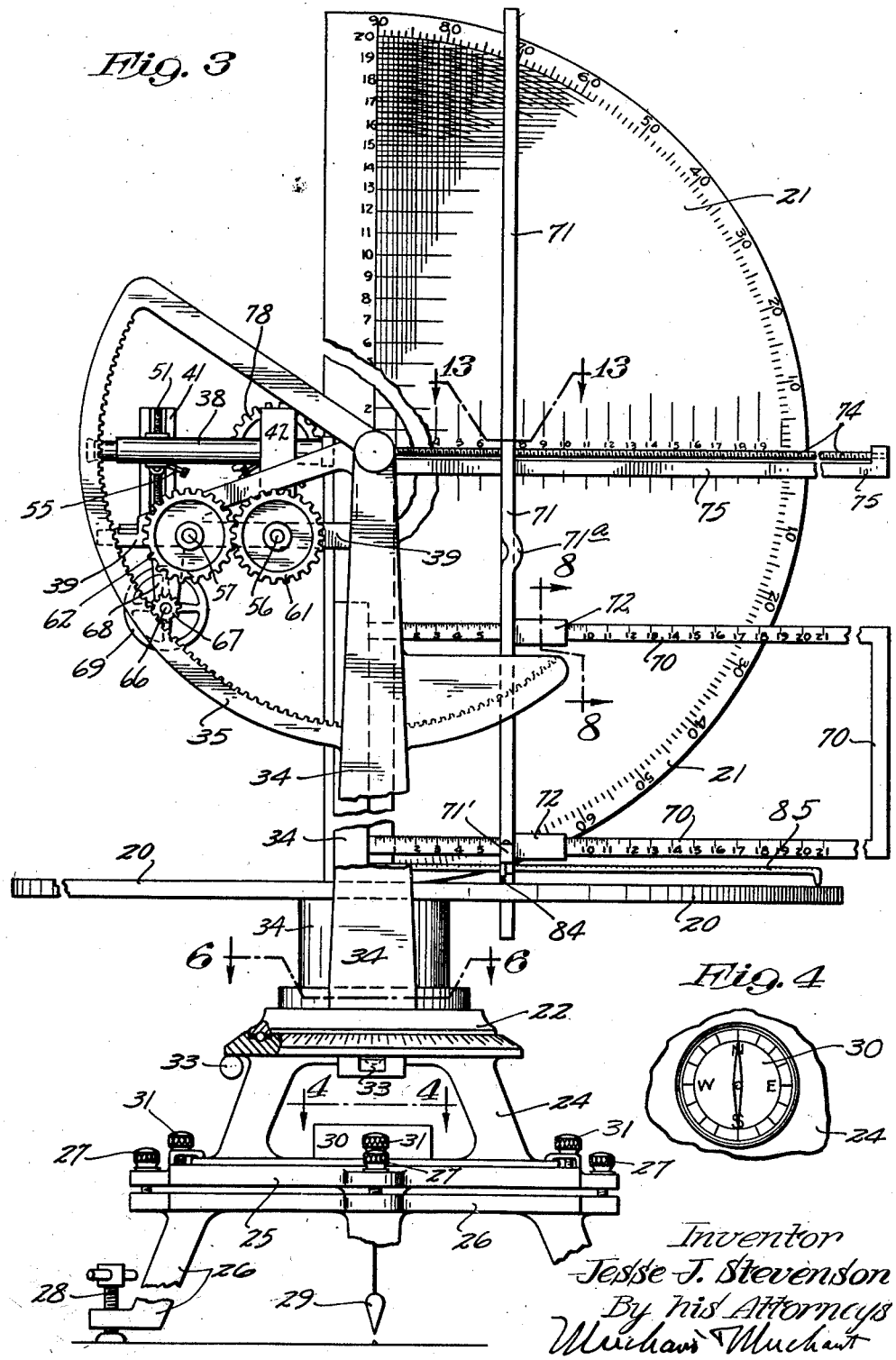
Fig. 3 is a side elevation of the improved instrument, some parts being broken away.
Fig. 4 is a fragmentary plan view showing a compass which, in practice, is preferably located just below the line marked 4—4 on Fig. 3.

In this instrument I provide a horizontal table 20 and a vertical table 21, the former of which is preferably in the form of a round disc and the latter of which is preferably a semi-circular disc. These two discs, by means that will presently be described, are maintained in the relative horizontal and vertical positions stated and both thereof are graduated to visually indicate degrees. These and other indicator markings could be made directly on the surfaces of these discs but for practical purposes the discs will be provided with detachable charting sheets, of such material as paper, and on which the graduations will be marked as well as on the tables themselves.

A turn-table 22 is journaled around a hub 23 of a lower base bracket 24 which, in turn, is shown as rotatively adjustable on a levelling table 25. Levelling table 25 is mounted for levelling adjustments on a base 26. By means of adjusting screws 27, levelling table 25 can be adjusted to true level. To true up the base 26, it is shown as provided in its legs with adjusting screws 28. The numeral 29 indicates a plumb bob suspended from the axis of levelling table 25. The numeral 30 indicates a compass placed on the levelling table. The numeral 31 indicates clamping screws for anchoring the base of bracket 24 to the levelling table 25.

The horizontal table 20 is shown as provided with an axially depending shank 32 seated in a correspondingly formed cavity in the hub 23 of base bracket 24. The numeral 33 indicates a level indicator such as ordinary spirit bulbs applied to the base bracket 24.

The vertical table 21 is capable of rotary adjustments around the vertical axis of table 20 preferably by means that will now be described. A U-shaped yoke 34 is formed with a vertically extended central hub, see Fig. 7, that is mounted to rotate around the hub 23 and bears upon the top of the base bracket 24. The arms of this U-shaped bracket or yoke 34 extend upward beyond the horizontal table 20 and both of said arms are formed integral with or rigidly secured to segmental racks 35, see particularly Fig. 3.

By reference to Fig. 1 it will be noted that the vertically disposed table 21 is located at one side of the horizontal turn-table in a position well above the same and is connected to one of the arms of the yoke 34 by means of angle brackets 36, see Figs. 1 and 5.

As important elements I employ a pair of sighting devices or sighting tubes which function as telescopes and will be herein broadly designated as telescopes. The primary telescope 37 is relatively fixed and the secondary telescope 38 is relatively adjustable both laterally and as to angle in respect to the primary telescope. The two telescopes are shown as mounted on a common rocking support in the nature of a skeleton-like substantially rectangular frame 39 which, at its ends, is shown as provided with horizontally extended trunnions 40 journaled in the upper ends of the arms of the yoke 34, as best shown in Fig. 1. This telescope supporting frame is thus mounted for tilting or rocking adjustments on the pivots 40.

The primary telescope 37 is rigidly secured to the tilting or rocking frame 39 but is preferably made detachable by a dovetailed connection to a post 41 rigidly secured on frame 39. Telescope 37 is set with its optical axis intersecting the vertically projecting axis of the horizontal table 20 and rocking frame and also intersecting, at a right angle, the projected horizontal axis of the pivots 40 of the rocking frame 39.

The secondary telescope 38 is indirectly and adjustably set on the frame 39 with its axis in the same horizontal plane as the axis of the telescope 37. This indirect connection between telescope 38 and frame 39 is made by a dovetailed joint with a post 42 on a plate 43. Plate 43 is mounted on an underlying flat bar 44, see particularly Fig. 11, that is supported at one end on the front transverse bar of frame 39 and at its other end slides within a longitudinal groove of the cross bar 39' and is slidably supported by said cross bar. At its inner end bar 44 is formed with a V-shaped seat in which the pointed end of plate 43 is fulcrummed for oscillatory movements of said supporting plate 43. Plate 43, at its front end, is adjustably secured to the front end of underlying plate 44 by a slot and nut-equipped screw connection 45. The two telescopes 37 and 38, when once set in the positions stated, will remain with their optical axes in the same horizontal plane. Telescope 37 will be permanently and properly set in a definite unchanged position while telescope 38 will be set in the plane stated but will be capable of angular adjustments in respect to the telescope 37 by the above noted adjustment of plate 43. As a means for primarily and permanently setting the telescope 37, I have shown means, best illustrated in Figs. 10 and 11, wherein the post 41 is shown as provided at its lower end with a gear-toothed hub 46 seated in an annular flange 47 rigidly secured on a bar 48 which, in turn, is rigidly secured to the front bar of frame 39 and to the cross bar 39'.

For oscillating post 41 gear 46 is engaged by the threaded portion of a shaft 49 which is journaled in the annular flange 47 and is provided with means such as a knurled knob 50. For vertically moving the telescope 37 on the post 41, a vertical adjusting screw 51 is mounted in post 41 and provided with a knurled knob 52.

The screw 51 has threaded engagement with the dovetailed head 53 of telescope 37. In Fig. 10 I have also indicated means for imparting oscillatory final adjustments to the telescope 37 and which means includes a worm gear 54 on the side of the telescope 37 which is contained within and pivotally connected to the dovetailed head 53. A worm threaded shaft 55, mounted also in the dovetailed head 53, operates on the gear 54 to oscillate the telescope 37 to final adjustment. So far as the broad idea of this invention is concerned, these adjusting elements might be dispensed with and the telescope 37 properly set once and for all.

For effecting the adjustments of telescope 38 in respect to plate 43, substantially the same kind of connection illustrated and best shown in Fig. 10 and just described may be employed, but such adjusting means could be ignored and plate 43 simply set for the angular adjustments thereof and of telescope 38 to vary the angle of convergence between the two telescopes.

Mounted in the tilting frame 39 are two threaded shafts 56 and 57, one with right threads and the other with left threads. These two threaded shafts extend through and have threaded engagement with nut-acting lugs 58 and 59 (Fig. 2) on the bottom of lower plate of bar 44. The unthreaded portions of shafts 56 and 57 are journaled in one side of tilting frame 39 and in bearing lugs 60 on frame bar 48, see particularly Figs. 1 and 2. Shafts 56 and 57, at one end, are equipped with intermeshing gears 61 and 62 which cause simultaneous rotations of the two shafts 56 and 57 in reverse directions and cause the two shafts to co-operate to move the bearing bar 44 in the one direction or the other according to which direction the shaft 57 is rotated. For rotation of the said shafts a hand wheel 63 is mounted to slide on the threaded portion of shaft 57 but is caused to rotate said shaft by means of a spline and groove connection 64 shown in Fig. 9. Here it will be noted that by rotation of said shafts in the one direction, telescope 38 will be moved toward the telescope 37, and by rotation in opposite direction will be moved away from said telescope 37. From the above it will be obvious that the threaded shafts 56 and 57 serve as conveying and guiding means for the secondary telescope 38, since they impart lateral movements to said telescope while retaining angular adjustments thereof with respect to the primary telescope 37.

It will be noted that the front bar of tilting frame 39 is provided with indicating means comprising graduations indicated at 65 in Fig. 1. The purpose of this will be later considered. As best shown in Figs. 1, 2 and 3, the numeral 66 is a hand-wheel-equipped shaft journaled in the tilting frame 39. This shaft, at its outer ends, is shown as provided with small spur pinions 67 that mesh with the internal teeth of the segmental racks 35. The pinion 67 which, as shown, is journaled in a depending lug 68 of frame 39 is provided on its shaft with an operating hand wheel 69, see Fig. 3. By rotation of hand wheel 69 and gear 67 frame 39 with its telescopes can be tilted or rocked both upwardly or downwardly in respect to a horizontal plane.

The numeral 70 indicates a rectangular frame that is rigidly secured to one of the uprights or arms of the yoke or frame 34, as best shown in Figs. 1 and 3. The numeral 71, see Figs. 1, 3 and 5, indicates a marker bar that has sleeve-like portions 72 mounted to slide on the graduated upper and lower horizontal bars of rectangular frame 70, preferably through anti-friction rollers 73, shown in detail in Fig. 8. The numeral 74 indicates a screw-rod that is rotatively mounted in a bar 75 which, in turn, is rigidly secured to and projects from the frame 39, as best shown in Figs. 1 and 12. This screw-rod 74, at one end, is journaled in the extended end of bar 75 and at its other end is journaled in the portion of frame 39, and at its extended end is connected by miter gears 76 to a transverse shaft 77 which, in turn, is journaled in the tilting frame 39. Shaft 77, near one end, is provided with a gear 78 that meshes with a gear 79 on the threaded shaft 56.

As best shown in Figs. 13 and 14, the screw shaft 74 has threaded engagement with a nut-acting bracket 80 which, by a pivot hub 81, is connected for oscillatory movements to a sliding block 82 which, in turn, is mounted for vertical sliding movements on the bar 71. Nut-acting bracket 80 carries a pointer or stylus 83 that works over the face of the vertical table 21 and performs a function hereinafter to be noted. Nut-acting bracket 80 is also mounted for sliding movements in bar 75.

Marker bar 71, best shown in Figs. 3 and 5, is shown as provided with an offset portion 71' that carries a stylus 84 that works over the face of the horizontal table 20 in a manner hereinafter to be described. The numeral 85 indicates a degree pointer that has a trunnion 86, see particularly Fig. 7, located at the axis of the horizontal table 20. The marker bar 71, at its intermediate portion is shown as bulged laterally at 71a for a purpose which will hereinafter appear.

The graduated scale or indicator means, on the front bar of frame 39, may be used in several different ways. For first example, we will assume that telescope 38 is set at such an angle and spacing in respect to telescope 37 that the lines of vision or optical axes of the two telescopes converge and intersect at a common remote point 600 feet distant from the fixed local sighting point, to wit: the point of intersection of the optical axis of the primary telescope 37 with the vertical and horizontal axes of the rocking frame or support 39 and the vertical axis of table 20. With the telescopes thus set the left hand edge of bar 44 will be registered with the numeral 6 on the graduated scale 65 of the front bar of frame 39 and this reading will indicate, not only the length of the base of the triangle formed by the optical axes of the two telescopes, but will further indicate the distance to the point of intersection of the optical axes of the two telescopes as being 600 ft. This assumes that the reading is taken with the frame 39 as well as the horizontal table set level or in a true horizontal plane. Obviously, the telescope 38 and its support may be moved toward and from the telescope 37 by rotation of the hand wheel 63 which simultaneously rotates both shafts 56 and 57. If, with the telescope 38 thus angularly adjusted, the lateral adjustments or translation thereof with respect to the telescope 37 causes the intersection of the optical axes of the two telescopes when the said left hand edge of bar 44 registers with the numeral 4 on the scale 65, then the reading on the scale would indicate the projected distance as 400 feet, and so on, through all of the different positions of the plate 43 with the telescope 38 set at the angle stated.

It will be remembered that when telescope 38 is moved laterally, the bars 71 and 71' and stylus 83 and stylus 84 will be correspondingly moved like distances on the respective tables 21 and 20 to positions with respect to the circular or arcuate lines of table 20 and 21 that correspond to the position indicated on scale 65 and that this is true throughout the various adjustments of the two sighting devices. Also, the same reading will be indicated by the position on the graduated upper and lower portions of frame 70. The movements just noted, of course, are produced through the means described including the heretofore described screw shaft 56, gears 78 and 79, shaft 77, miter gears 76, screw shaft 74, bars 71 and 71', and stylus 83. The above operation assumed that the adjustments were all made with the tilting frame 39 level. However, it should be understood that if the tilting or rocking frame 39 is tilted at an angle to a horizontal plane, then the movement imparted to stylus 83 as a result of lateral translation of the telescope 38 will then be different than the movement imparted to stylus 84, and said stylus 83 will then indicate in conjunction with the arcuate lines of the vertical table 21 the length of the inclined plane to the point of intersection of the optical axes of the two telescopes.

The following example of the use of the instrument is now given. Assume that it is the straight line distance from the fixed local point of survey or sighting point to the top of a distant tower that is to be determined; said fixed local sighting point being the point of intersection of the optical axis of telescope 37 with the vertical axis of the horizontal table and the horizontal and vertical axes of the rocking frame or support 39. The horizontal table 20 should be rotated on the vertical axis so as to set its zero mark of its circumferentially extended arcuate degree scale in a true northerly direction from the axis of the horizontal table. This adjustment can be made by rotation of the base bracket 24 and the table then locked and positioned by the clamping screws 31. Next, the U-shaped frame 34 will be rotated on its axis until the primary telescope 37 is brought into the vertical plane of the distant elevated point on the tower, and next, the frame 39 will be tilted so as to direct the optical axis or line of vision of telescope 37 directly onto the point to be surveyed. Next, the telescope 38 will be laterally adjusted until its optical axis or line of vision is focused upon or intersects the same point that is focused or intersected by the primary telescope 37.

The downward rocking movement of frame 39, through connections already described, moves bars 71 and 71' to the left in respect to the elevation, Fig. 3, but the extent of such movement further depends upon the amount of lateral movement or translation of telescope 38 with respect to telescope 37. The supplemental or additional movement transmitted under the operation just described was through the rocking action of the frame causing bar 75 to move upward over the degree scale to an extent depending on the amount of tilting of said frame 39.

It will now be remembered that by the connections best shown in Figs. 12, 13 and 14, the screw rod 74 is connected to marker bar 71 by a sliding pivot which causes bar 71 to move laterally while maintaining its vertical position on its guides. The movement of bar 71 causes stylus 84 to move radially of and on the horizontal table 20 and also causes the stylus 83 to move circumferentially over the table 21. Then, when telescope 38 is adjusted laterally to focus on the elevated point to be sighted, the readings on the instrument will be substantially as follows: The level distance to the object will be indicated on the graduated portions of frame 70, by the position of stylus 84 in respect to the arcuate lines of horizontal table 20 and by the position of stylus 83 with respect to the straight, vertical lines on vertical table 21; and the oblique or straight line distance to the elevated point will be indicated on the graduated scale 65, and by the position of stylus 83 with respect to the arcuate lines of vertical table 21.

If, when the telescopes 37 and 38 have been focused on the elevated point, the readings on the scale 65 and the arcuate scale of table 20 are at 6 that will indicate the straight line distance to the elevated point to be 600 feet from the fixed local sighting point, to wit: the point of intersection of the optical axis of the primary telescope 37 with the horizontal and vertical axes of the tilting or rocking frame 39.

The straight line horizontal distance to the tower will be indicated by the position of stylus 84 on the graduated radially spaced arcuate lines of horizontal table 20 and will also be indicated on the graduated bars of frame 70, and will be still further indicated by the position of stylus 83 with respect to the graduated vertical lines of vertical table 21; and will be slightly less than the oblique distance from the axis of the horizontal table to the top of the tower.

The height of the tower will also be indicated by the position of stylus 83 with respect to the graduated horizontal lines of the table or dial 21 and also by the position of the upper edge of bar 75 on the graduations of the marker bar 71.

In the above illustration the angle of the optical axis of telescope 38 to the optical axis of telescope 37 is assumed to be such that the numerical graduations on the several scales would be read in hundred feet and fractions thereof. Of course, by increasing the angle of the telescope 38 to telescope 37, the reading could be made in units of ten feet and fractions thereof, for example, and by decreasing the angle of telescope 38, in respect to telescope 37, the reading could be increased so as to be read in units of a thousand feet, for example, and fractions thereof.

Under the various movements described, the arm 85 will be moved over the degree graduated face of horizontal table 20 and will assume a position that will indicate the number of degrees in a horizontal direction that the projected line of vision deviates from north, for example. As shown in part at the top in Fig. 1, the horizontal table 20 has factored graduations indicated at y.

If the measurements above taken are first at one object and then at a spaced distant object, such successive measurements would be taken while the horizontal table 20 is stationary and by horizontal swinging movements of the U-shaped frame 34 would cause stylus 84 to move over the face of the graduations y. By observing on the factored chart y the number of spaces laterally and the number of spaces radially inward, easy calculation can be made of the location of the second object in respect to the first object, both laterally and toward or from the observation point. Otherwise stated, this chart will indicate the distance between the two objects and the distance of the second object from the sighting point.

It has been above stated that this instrument will measure the altitude of a different distant object such as a tower. Obviously the instrument, by the operations described, will measure not only the distance of the altitude of a tower from a level line of projection, but will measure the distance from the level to the base of such tower; and, of course, when the altitude above and the altitude below such a level is added together, the sum would be the actual heighth of the tower from the ground or base. The plotting tables described are highly important for actually charting diagrammatically the various surveyed dimensions, but most of these dimensions will be indicated directly on the scales described even when the tables are not provided.

What is at present believed to be the preferred form of the device has been illustrated and described, but it will be understood that various alterations may be made within the scope of the invention herein disclosed and claimed.

Broadly considered the stylus 83, the stylus 84, and all those elements cooperating with any of the various scales of the machine are pointers and may be properly referred to as such. Also, all of the various scales of the machine and their cooperating pointers or indicating elements may be broadly defined as "indicator means" and may, therefore, be properly hereinafter referred to as "indicator means."

What I claim is:

1. In a device of the kind described, a rocking support, means mounting the rocking support for pivotal adjusting movements on a horizontal axis, a primary sighting device mounted on the rocking support and set with its optical axis intersecting the horizontal axis of the rocking support at a right angle thereto, a secondary sighting device mounted on said rocking support for translation thereon toward and from the primary sighting device, said secondary sighting device being set so that its optical axis intersects the optical axis of the primary sighting device and also intersects the horizontal axis of the rocking support, guide means retaining the said setting of the secondary sighting device under lateral translation thereof toward and from the primary sighting device, means mounting said rocking support for rotary adjustments on a vertical axis that intersects the horizontal axis of the rocking support and the optical axis of the primary sighting device, indicator means operatively coupled to the secondary sighting device and responsive to relative translation of the two sighting devices to indicate the distance from the point of intersection of the optical axis of the primary sighting device with horizontal and vertical axes of the rocking support to the point of convergence of the optical axes of the two sighting devices, and indicator means operatively coupled to the rocking support and responsive to pivotal movements thereof on a horizontal axis to indicate the vertical distance from a projected horizontal plane through the horizontal axis of the rocking support to the point of convergence of the optical axes of the two sighting devices.

2. In a device of the kind described, a rocking support, means mounting the rocking support for pivotal adjusting movements on a horizontal axis, a primary sighting device mounted on the rocking support and set with its optical axis intersecting the horizontal axis of the rocking support at a right angle thereto, a secondary sighting device mounted on said rocking support for translation thereon toward and from the primary sighting device, said secondary sighting device being set so that its optical axis intersects the optical axis of the primary sighting device and also intersects the horizontal axis of the rocking support, guide means retaining the said setting of the secondary sighting device under lateral translation thereof toward and from the primary sighting device, means mounting said rocking support for rotary adjustments on a vertical axis that intersects the horizontal axis of the rocking support and the optical axis of the primary sighting device, the said point of intersection of the horizontal and vertical axes of the rocking support and the optical axis of the primary sighting device representing a fixed local sighting point from which all measurements are taken, indicator means comprising a flat vertically disposed table and a pointer movable over the flat face of the table, said table being provided with radially spaced arcuate lines and spaced parallel vertical lines and spaced parallel horizontal lines, operating connections between the secondary sighting devices and said pointer moving the pointer radially of the axis of said arcuate table lines responsive to translation of the secondary sighting device, and operating connections between the said rocking support and said pointer imparting arcuate movements to said pointer responsive to tilting movements of the rocking support on its horizontal axis, the arcuate table lines being calibrated to indicate the straight line distance from the said fixed local sighting point to the point of intersection of the optical axes of the two sighting devices, the vertical table lines being calibrated to indicate the horizontal distance from the said fixed local sighting point to a point in vertical alignment with the said point of intersection of the optical axes of the two sighting devices, and the said horizontal table lines being calibrated to indicate the vertical distance between the horizontal plane through said fixed local sighting point and a horizontal plane through the said point of intersection of the two sighting devices.

3. In a device of the kind described, a rocking support, means mounting the rocking support for pivotal adjusting movements on a horizontal axis, a primary sighting device mounted on the rocking support and set with its optical axis intersecting the horizontal axis of the rocking support at a right angle thereto, a secondary sighting device mounted on said rocking support for translation thereon toward and from the primary sighting device, said secondary sighting device being set so that its optical axis intersects the optical axis of the primary sighting device and also intersects the horizontal axis of the rocking support, guide means retaining the said setting of the secondary sighting device under lateral translation thereof toward and from the primary sighting device, means mounting said rocking support for rotary adjustments on a vertical axis that intersects the horizontal axis of the rocking support and the optical axis of the primary sighting device, the said point of intersection of the horizontal and vertical axes of the rocking support and the optical axis of the primary sighting device representing a fixed local sighting point from which all measurements are taken, indicating means comprising a flat horizontal table and pointers movable over the face of said table, said table being disposed to intersect the vertical axis of said rocking support and being provided with radially spaced arcuate lines calibrated to indicate the horizontal distance from the said fixed local sighting point to a point in vertical alignment with the point of intersection of the optical axes of the two sighting devices and being provided with an arcuate scale indicating direction of the primary sighting device, the axes of the said radially spaced arcuate lines and the arcuate scale being common to the vertical axis of the rocking support, operating connections between the secondary sighting device and one of said pointers moving one of said pointers radially of the said vertical axis responsive to translation of the secondary sighting device, and operating connections between the other of said pointers and the rocking support imparting thereto common arcuate movements about the said vertical axis of the rocking support, whereby the locations and relative locations of different objects may be plotted on said horizontal table.

4. In a device of the kind described, a rocking support, means mounting the rocking support for pivotal adjusting movements on a horizontal axis, a primary sighting device mounted on the rocking support and set with its optical axis intersecting the horizontal axis of the rocking support at a right angle thereto, a secondary sighting device mounted on said rocking support for translation thereon toward and from the primary sighting device, said secondary sighting device being set so that its optical axis intersects the optical axis of the primary sighting device and also intersects the horizontal axis of the rocking support, guide means retaining the said setting of the secondary sighting device under lateral translation thereof toward and from the primary sighting device, means mounting said rocking support for rotary adjustments on a vertical axis that intersects the horizontal axis of the rocking support and the optical axis of the primary sighting device, the said point of intersection of the horizontal and vertical axes of the rocking support and the optical axis of the primary sighting device representing a fixed local sighting point from which all measurements are taken, indicator means comprising a flat vertically disposed table and a pointer movable over the flat face of the table, said table being provided with radially spaced arcuate lines and spaced parallel vertical lines and spaced parallel horizontal lines, horizontal guide means projecting radially of the vertical axis of the rocking support and mounted for common rotation therewith on its vertical axis, a vertically disposed beam carried by and slidably mounted on said radially projecting horizontal guide means, means operatively connecting the said pointer to said vertical beam and guiding the same for sliding movements longitudinally thereof, a conveyor extending parallel to the face of said vertical table and radially of the horizontal axis of the rocking support, said conveyor and the face of said vertical table being disposed at right angles to the horizontal axis of the rocking support, operating connections between the said conveyor and said vertical beam for imparting horizontal movements to said vertical beam on its guide means, connections between said conveyor and rocking support transmitting tilting movements of the rocking support on its horizontal axis to said conveyor, and operating connections between the secondary sighting device and said conveyor operating said conveyor to move said pointer longitudinally of said radially extended conveyor responsive to translation of the secondary sighting device, whereby said pointer in combination with the said arcuate, vertical and horizontal lines of said table will simultaneously indicate the straight line distance to the point of intersection of the two sighting devices and the horizontal distance to a point in vertical alignment with said point of intersection of the optical axis of the two sighting devices and the vertical distance from a horizontal plane intersecting the fixed local sighting point and a horizontal plane intersecting the said point of intersection of the optical axes of the two sighting devices.

JESSE J. STEVENSON.